US008448719B2

(12) United States Patent
Furukawa (10) Patent No.: US 8,448,719 B2
(45) Date of Patent: May 28, 2013

(54) KEY EXCHANGE DEVICE (75) Inventor: Jun Furukawa, Tokyo (JP)

(73) Assignee: Nec Corporation, Tokyo (JP)

( * ) Notice: Subject to any disclaimer, the term of this patent is extended or adjusted under 35 U.S.C. 154(b) by 281 days.

(21) Appl. No.: 12/670,841

(22) PCT Filed: Jun. 9, 2008

(86) PCT No.: PCT/JP2008/060556
§ 371 (c)(1),
(2), (4) Date: Jan. 26, 2010

(87) PCT Pub. No.: WO2009/019932
PCT Pub. Date: Feb. 12, 2009

(65) Prior Publication Data
US 2010/0199093 A1 Aug. 5, 2010

(30) Foreign Application Priority Data
Aug. 9, 2007 (JP) .................................. 2007-208197

(51) Int. Cl.
*H04L 9/32* (2006.01)
(52) U.S. Cl.
USPC ........... 173/171; 173/150; 173/156; 173/170; 173/176; 173/189; 380/277; 380/278; 380/44
(58) Field of Classification Search
USPC .......................... 713/171; 380/278, 277, 282
See application file for complete search history.

(56) References Cited

U.S. PATENT DOCUMENTS

| 6,628,786 | B1 * | 9/2003 | Dole | 380/44 |
| 7,010,692 | B2 * | 3/2006 | Jablon | 713/171 |
| 7,590,236 | B1 * | 9/2009 | Boneh et al. | 380/30 |
| 8,281,144 | B2 * | 10/2012 | Huh et al. | 713/182 |
| 8,316,237 | B1 * | 11/2012 | Felsher et al. | 713/171 |
| 2002/0056040 | A1 * | 5/2002 | Simms | 713/171 |
| 2004/0223619 | A1 * | 11/2004 | Jablon | 380/277 |
| 2005/0076217 | A1 * | 4/2005 | Lord et al. | 713/171 |
| 2005/0111668 | A1 * | 5/2005 | Raikar | 380/278 |

(Continued)

FOREIGN PATENT DOCUMENTS

| JP | 11-234263 A | 8/1999 |
| JP | 2006339847 A | 12/2006 |
| JP | 2007049571 A | 2/2007 |

OTHER PUBLICATIONS

Au et al., "Constant-Size Dynamic k-TAA," Springer-Verlag Berlin Heidelberg, 2006, pp. 111-123.*

(Continued)

*Primary Examiner* — Luu Pham (57) ABSTRACT

The present invention includes a section (102) for generating a plurality of contributing random numbers using a random number, a section (110) for generating a plurality of contributing data using a plurality of contributing random numbers, a section (103) for selecting a number designating contributing data, a section (104) for generating a commitment of the number, a section (126) for saving a contributing random number of the number and disclosure information of the commitment, a section (125) for sending the plurality of contributing data and the commitment, section (134) for generating auxiliary data using a contributing data set and the contributing random number, wherein the auxiliary data and the disclosure information of the commitment are sent from the section (125), and a section (139) for generating a shared key using the contributing data set, the disclosure information of the commitment, the auxiliary data, and the contributing random number.

3 Claims, 4 Drawing Sheets

U.S. PATENT DOCUMENTS

| | | | | |
|---|---|---|---|---|
| 2005/0149730 | A1* | 7/2005 | Aissi et al. | 713/168 |
| 2006/0010489 | A1* | 1/2006 | Nastou et al. | 726/9 |
| 2006/0123235 | A1* | 6/2006 | Vanstone | 713/171 |
| 2007/0028106 | A1* | 2/2007 | Lauter et al. | 713/171 |
| 2007/0097878 | A1* | 5/2007 | Morioka et al. | 370/254 |
| 2008/0181401 | A1* | 7/2008 | Picquenot et al. | 380/247 |
| 2010/0100740 | A1* | 4/2010 | Ho | 713/171 |
| 2010/0104094 | A1* | 4/2010 | Takashima | 380/28 |

OTHER PUBLICATIONS

Bresson et al., "Constant Round Authenticated Group Key Agreement via Distributed Computation," International Association for Cryptologic Research, 2004, p. 115-128.*

Jarecki et al., "Group Secret Handshakes or Affiliation-Hiding Authenticated Group Key Agreement," Springer-Verlag Berlin Heidelberg, 2007.*

Imamoto et al., "Key Exchange Protocol Using Pre-agreed Session-ID," Springer-Verlag Berlin Heidelberg, 2004, pp. 375-386.*

Ghanem et al., "A Secure Group Key Management Framework: Design and Rekey Issues," IEEE, 2003, pp. 1-6.*

Hong et al., "Enhanced Group Key Generation Algorithm," IEEE, 2006, pp. 1-4.*

Poovendran et al., "A Distributed Shared Key Generation Procedure Uisng Fractional Keys," IEEE, 1998, pp. 1038-1046.*

Wang et al., "An Efficient Method of Group Rekeying for Multicast Communication," IEEE, 2004, pp. 273-277.*

Adusumilli et al., "DGKD: Distributed Group Key Distribution with Authentication Capability," IEEE, 2005, pp. 286-294.*

Amir et al., "Secure Group Communication Using Robust Contributory Key Agreement," IEEE, 2004, pp. 468-490.*

International Search Report for PCT/JP2008/060556 mailed Sep. 9, 2008.

J. Katz et al., "Modeling Insider Attacks on Group Key-Exchange Protocols", ACM Conference on Computer and Communications Security 2005, 2005, 180-189.

M. Burmester et al., "A Secure and Efficient Conference Key Distribution System", Springer-Verlag, 1998, pp. 275-286.

R. Zhang et al., "Decomposable Commitment Schemes and Its Applications", The 25th Symposium on Information Theory and Its Applications (SITA2002), Dec. 10, 2002, pp. 527-530.

J. Furukawa et al., "An Efficient Group Signature Scheme from Bilinear Maps", LNCS, Jul. 21, 2005, vol. 3574, pp. 455-467.

Y. Desmedt et al., "A Non-malleable Group Key Exchange Protocol Robust Against Active Insiders", LNCS, Oct. 17, 2006, vol. 4176, p. 459-475.

J. Furukawa et al. "Universally Composable Adaptive Group Key Exchange with Minimum Communication Complexity", The Symposium on Cryptography and Information Security, Jan. 22, 2008, pp. 1-6.

* cited by examiner

KEY EXCHANGE DEVICE

TECHNICAL FIELD

The present invention relates to key exchange devices for exchanging the same key by communicating with each other.

BACKGROUND ART

Non-patent document 1 discloses a scheme for a key exchange device. A scheme which is realized by applying the scheme disclosed in Non-patent document 1 to a protocol (protocol3) disclosed in Non-patent document 2 will be described below with reference to FIG. 1.

Figure 1:
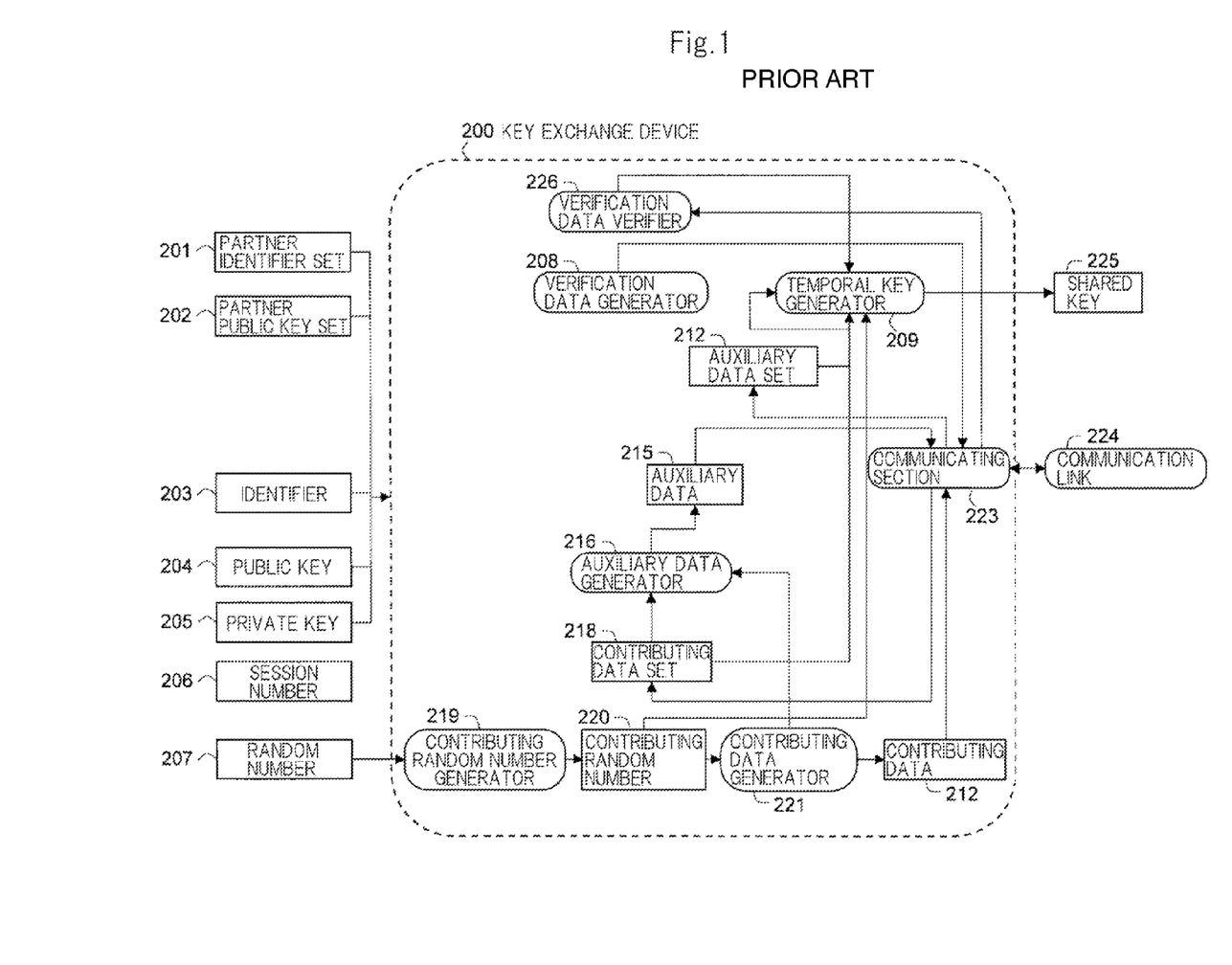
FIG. 1 is a diagram showing a configurational example of a key exchange device according to the background art.

FIG. 1 is a diagram showing a configurational example of key exchange device 200 according to the background art.

First, notations will be described below.

It is assumed that p represents a prime number and $G_T$ a cyclic group of order q. The number of key exchange devices 200 is represented by n and each of key exchange devices 200 is numbered with i. An identifier indicative of key exchange device 200(i) is represented by U[i]. g represents a generator of $G_T$, v, w represent integral numbers that are selected at random. F, F' represent pseudo-random number generating devices.

The configuration of key exchange device 200 will be described below.

As shown in FIG. 1, key exchange device 200 comprises verification data generator 208, temporal key generator 209, auxiliary data generator 216, contributing random number generator 219, contributing data generator 221, communicating section 223, and verification data verifier 226.

Key exchange device 200(i) thus constructed is supplied with partner identifier set 201 which is a set of identifiers of key exchange device 200(j) where j={1, ..., n}¥i, and partner public key set 202(pid) which is a set of public keys pk[j] of key exchange device 200(j). Key exchange device 200(i) is also supplied with identifier 203(U[i]) and public key 204(pk[i]) of its own key exchange device 200(i) and private key 205(sk[i]) corresponding to public key 204(pk[i]). Key exchange device 200(i) is also supplied with session number 206(sid) unique to shared key 225(sk[i]) to be generated and random number 207.

In key exchange device 200(i), contributing random number generator 219 randomly generates contributing random number 200(r[i]∈Z/qZ) using random number 207.

Then, in key exchange device 200(i), contributing data generator 221 generates contributing data 222(y[i]=$g^{r[i]}$) using contributing random number 200(r[i]∈Z/qZ) generated by contributing random number generator 219, and also generates signature sig(i,1) with respect to sid, 1, U[i], y[i].

Then, in key exchange device 200(i), communicating section 223 sends (sid, 1, U[i], y[i], sig(i,1)) to other (n−1) key exchange device 200(j).

In key exchange device 200(i), communicating section 223 waits for y(j) to be sent via communication link 224 from all key exchange devices 200(j) where j={1, ..., n}¥i.

When all y[j] are supplied and contributing data set 218 is available, key exchange device 200(i) verifies each signature.

Then, in key exchange device 200(i), auxiliary data generator 216 generates auxiliary data 215(x[i]=(y[i+1]/y[i−1])$^{r[i]}$) using contributing data set 218, and generates signature sig(i,2) with respect to (sid, 2, U[i], x[i]).

Then, in key exchange device 200(i), communicating section 223 sends (sid, 2, U[i], x[i], sig(i,2)) to other (n−1) key exchange device 200(j).

When all x[j] are supplied and auxiliary data set 212 is available, key exchange device 200(i) verifies each signature.

Then, in key exchange device 200(i), temporal key generator 209 generates k[i]=(y[i−1])$^{r[i]n}$x[i+1]$^n$x[i+2]$^{n-1}$ ..., x[n]$^{i+1}$x[1]$^i$ ... x[i−1]$^2$ ... x[1].

Then, in key exchange device 200(i), verification data generator 208 generates ack[i]=F(k[i],v), and temporal key generator 209 generates shared key 225 (sk[i]=F'(k[i],w)). Key exchange device 200(i) generates signature sig(i,3) with respect to (sid[i], 3, U[i], y[i], ack[i]).

Then, in key exchange device 200(i), communicating section 223 sends (sid, 3, U[i], ack[i], sig(i,3)) to other (n−1) key exchange device 200(j).

When all ack[j] are supplied, verification data verifier 226 of key exchange device 200(i) verifies each signature.

Thereafter, in key exchange device 200(i), verification data verifier 226 confirms ack[j]=ack[i] with respect to all j={1, ..., n}¥i, and temporal key generator 209 outputs shared key 225 (sk[i]).

According to the background art shown in FIG. 1, however, each key exchange device has to be supplied with a unique session number. To this end, the key exchange devices which take part in a session need to distribute data such as random numbers to each other three times and to perform a process of joining the distributed data into a unique session number. Consequently, control cannot go to the next step unless the distribution to the entire system by all the key exchange devices is completed. The time required for the distribution is much longer than the time required to calculate each of the data. Therefore, for quickly exchanging keys between a number of key exchange devices, it is necessary to delete the distribution of such data.

Non-patent document 1: Jonathan Katz, Ji Sun Shin: Modeling insider attacks on group key-exchange protocols. ACM Conference on Computer and Communications Security 2005: 180-189

Non-patent document 2: Mike Burmester, Yvo Desmedt: A Secure and Efficient Conference Key Distribution System: 275-285

DISCLOSURE OF THE INVENTION

It is an object of the present invention to provide a key exchange device which solves the problem, described above, in which a key exchange cannot quickly be performed between a plurality of key exchange devices.

To achieve the above object, there is provided a key exchange apparatus for being supplied with a public key, a private key, an identifier, a partner public key set, a partner identifier set, and a random number, communicating with a plurality of partner devices which are identified by identifiers that belong to said partner identifier set, and generating and outputting a shared key, comprising:

a contributing random number generator for generating a plurality of contributing random numbers using said random number;

a contributing data generator for generating a plurality of contributing data using said plurality of contributing random numbers;

a selector for selecting a number designating contributing data to be used to generate said shared key from said plurality of contributing data;

a commitment generator for generating a commitment of said number;

an internal state saving section for saving, as an internal state, a contributing random number of said number and disclosure information of said commitment;

a communicating section for sending said plurality of contributing data and said commitment to said plurality of partner devices;

an auxiliary data generator for generating auxiliary data using a contributing data set which is a set of all said contributing data received from said plurality of partner devices via said communicating section and said contributing random number saved in said internal state saving section;

wherein said auxiliary data and said disclosure information of said commitment are sent from said communicating section to said plurality of partner devices; and a shared key generator for generating and outputting said shared key using said contributing data set, said disclosure information of said commitment, and said auxiliary data which are received from said plurality of partner devices via said communicating section, and said contributing random number saved in said internal state saving section.

According to the present invention, as described above, when a private key is shared between a plurality of key exchange devices, the key exchange devices may distribute data only twice, one time less than with the background art. Consequently, it is possible to exchange a key more quickly.

BEST MODE FOR CARRYING OUT THE INVENTION

A best mode for carrying out the present invention will be described below with reference to the drawings.

Figure 2:
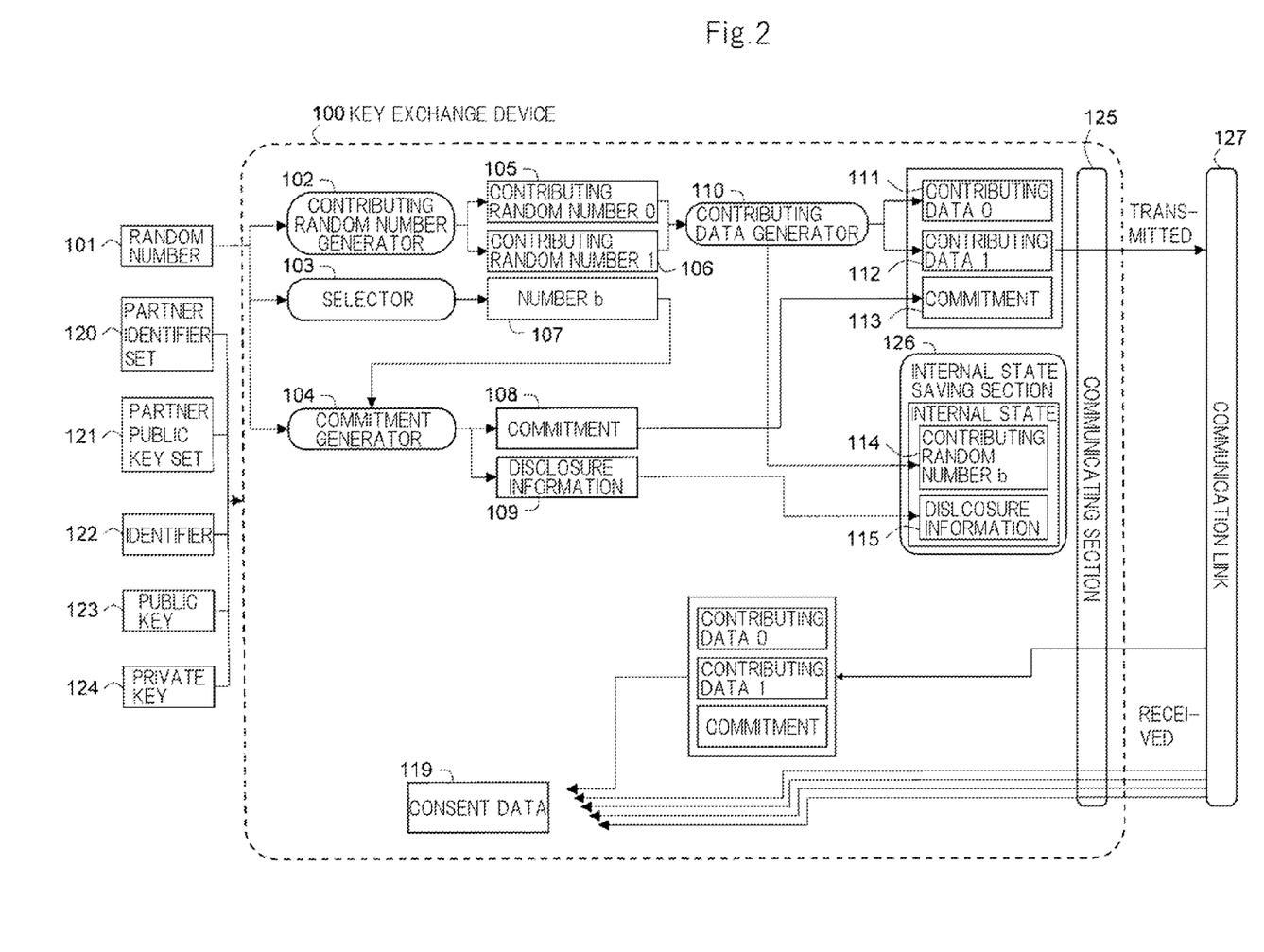
FIG. 2 is a diagram showing a portion of a configuration of a key exchange device according to a present exemplary embodiment.
Figure 3:
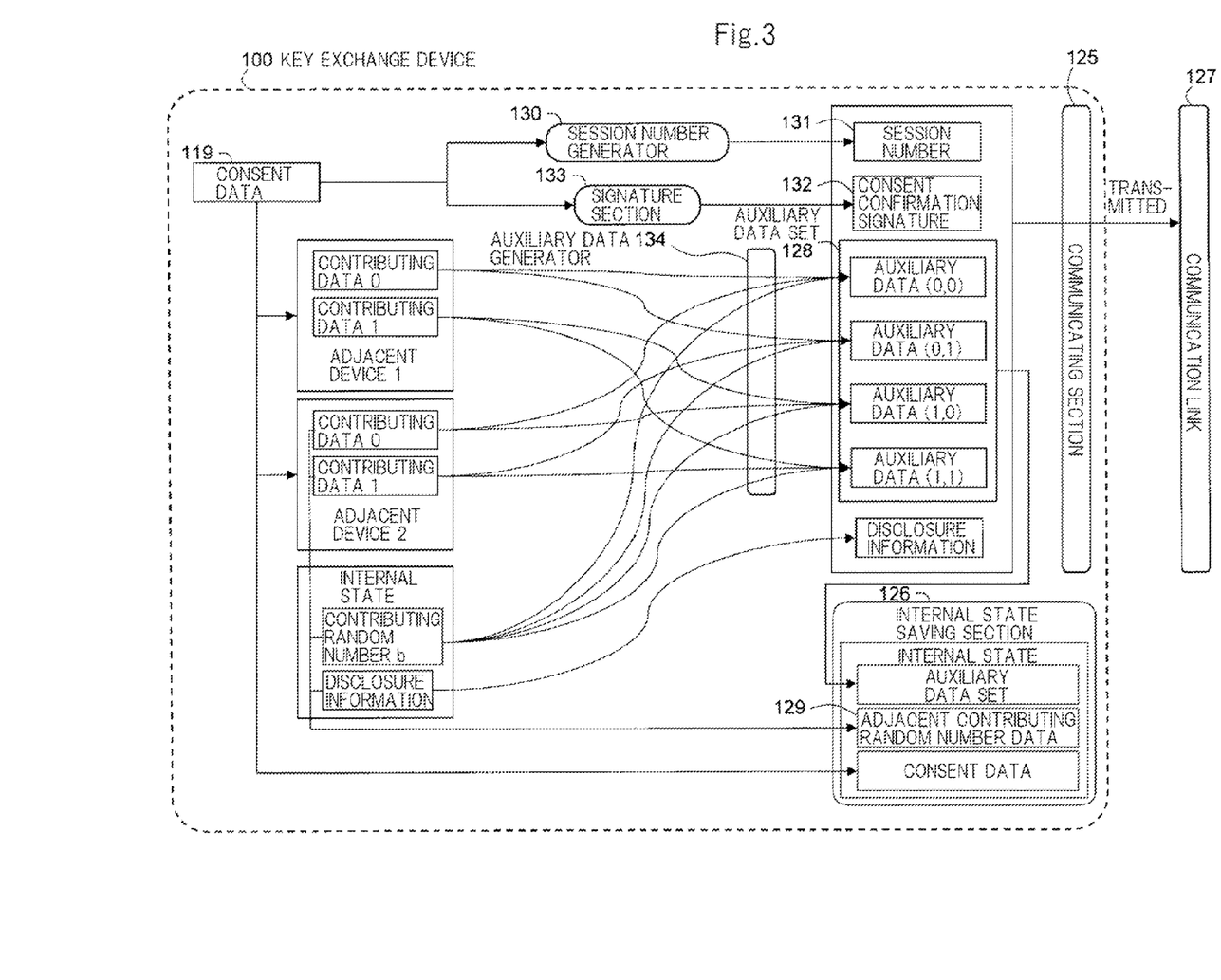
FIG. 3 is a diagram showing a portion of a configuration of the key exchange device according to the present exemplary embodiment.
Figure 4:
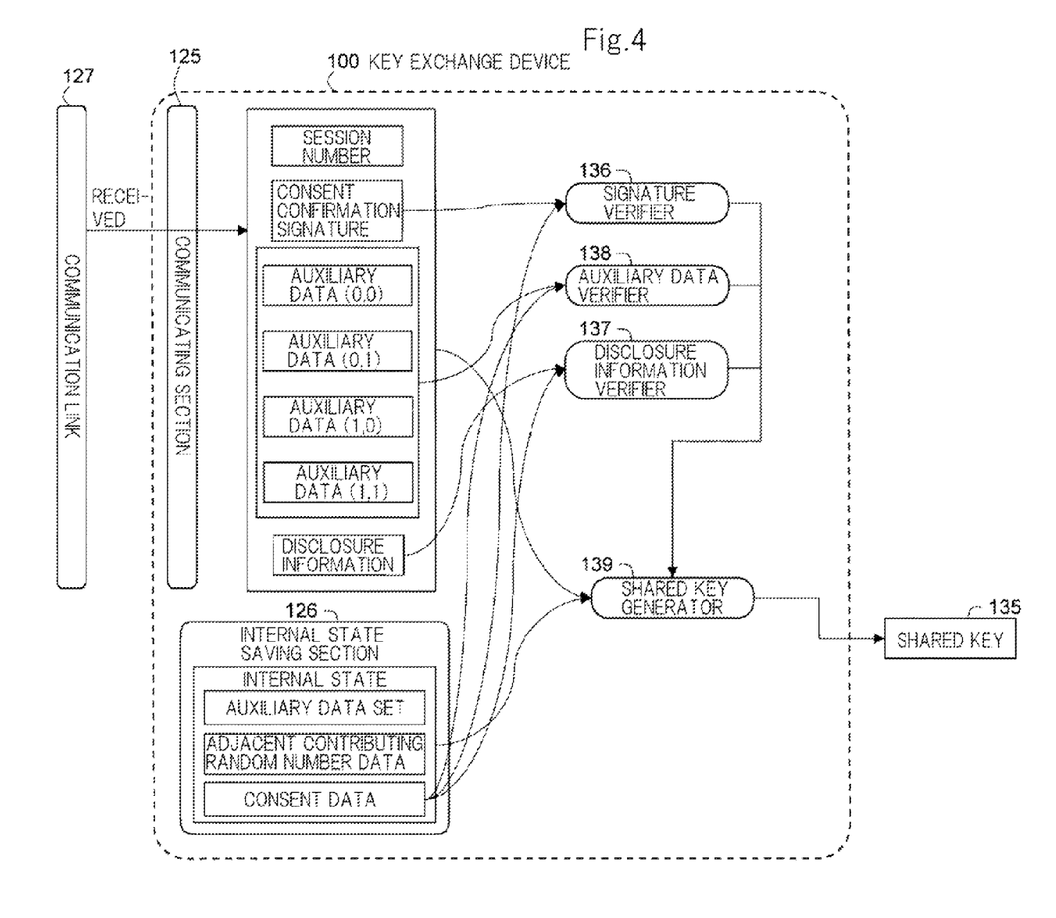
FIG. 4 is a diagram showing a portion of a configuration of the key exchange device according to the present exemplary embodiment.

FIGS. 2 through 4 are diagrams showing portions of configurations of key exchange device 100 according to an exemplary embodiment of the present invention. Specifically, FIG. 2 shows the configuration of a portion for generating and communicating contributing data and a commitment, FIG. 3 shows the configuration of a portion for generating and communicating auxiliary data, and FIG. 4 shows the configuration of a portion for generating and outputting a shared key.

Notations Used in the Present Exemplary Embodiment

It is assumed that p represents a prime number, G, $G_T$ cyclic groups of order p, and e a nondegenerate bilinear mapping from G×G to $G_T$.

The term "bilinear" means that $e(g^\alpha, g^\beta) = e(g,g)^{\alpha\beta}$ is satisfied with respect to all $\alpha, \beta \in qZ$ and $g \in G$.

The term "nondegenerate" means that when g is a generating element of G, e(g,g) is a generating element of $G_T$.

If a trapdoor commitment scheme has been prepared, then it is assumed that the system variable of the scheme is represented by tpram and the trapdoor key by tdr. When message m is given by the scheme, commitment corn and commitment disclosure information dec can be generated. When dec is given, it can be verified that corn is generated as a commitment of message m. When corn, m', dec, tdr are given, dec' indicating that corn is a commitment of m' can be generated.

The number of key exchange devices 100 is represented by n, and each of key exchange devices 100 is numbered with i. An identifier indicative of key exchange device 100(1) is represented by U[i]. g, h represent generators of $G_T$.

Configuration of the Present Exemplary Embodiment

As shown in FIGS. 2 through 4, key exchange device 100 comprises contributing random number generator 102, selector 103, commitment generator 104, contributing data generator 110, communicating section 125, internal state saving section 126, session number generator 130, signature section 133, auxiliary data generator 134, signature verifier 136, disclosure information verifier 137, auxiliary data verifier 138, and shared key generator 139.

Key exchange device 100 is supplied with random number 101, partner identifier set 120, partner public key set 121, identifier 122, public key 123, and private key 124. Key exchange device 100 communicates with other key exchange devices which are identified by identifiers that belong to partner identifier set 120, and generates and outputs shared key 135.

Contributing random number generator 102 generates two contributing random numbers 105, 106 using random number 101. Contributing data generator 110 generates two contributing data 111, 112 using two Contributing random numbers 105, 106 generated by contributing random number generator 102. Though two contributing random numbers and two contributing data are generated in the illustrated exemplary embodiment, they may be generated in any number provided they are plural.

Selector 103 selects number 107 designating contributing data used to generate shared key 135 from two contributing data 111, 112.

Commitment generator 104 generate commitment 108 of number 107 selected by selector 103 and its disclosure information 109.

Internal state saving section 126 saves, as an internal state, contributing random number 114 of number 107 selected by selector 103 and disclosure information 115 of commitment 108 of number 107 selected by selector 103. In other words, internal state saving section 126 erases other contributing numbers than number 107 selected by selector 103.

Communicating section 125 sends two contributing data 111, 112 generated by contributing data generator 110 and commitment 108 of number 107 selected by selector 103 to the other key exchange devices via communication link 127.

Communicating section 125 also receives contributing data and commitments from the other key exchange devices via communication link 127. A set of all the contributing data of the other key exchange devices is referred to as a contributing data set.

Signature section 133 generates consent confirmation signature 132 which is a signature for the contributing data set of the other key exchange devices, using public key 123 and private key 124. Signature section 133 uses an aggregate signature as a signature scheme for generating consent confirmation signature 132.

Auxiliary data generator 134 generates auxiliary data using the contributing data set of the other key exchange devices and the contributing random number saved in internal state saving section 126.

Specifically, auxiliary data generator 134 takes out the contributing data set of two other key exchange devices from the contributing data set, and generates auxiliary data with respect to all combinations of one of two contributing data of one of the key exchange devices and one of two contributing data of the other of the key exchange devices. A set of all the auxiliary data is referred to as auxiliary data set 128.

Communicating section 125 sends auxiliary data set 128 generated by auxiliary data generator 134, the disclosure information of the commitment saved in internal state saving section 126, and consent confirmation signature 132 generated by signature section 133, to the other key exchange devices via communication link 127.

Communicating section 125 also receives auxiliary data sets, disclosure information of commitments, and consent confirmation signatures from the other key exchange devices via communication link 127.

Signature verifier 136 verifies the validity of the consent confirmation signatures of the other key exchange devices using partner identifier set 120, partner public key set 121, and the contributing data set of the other key exchange devices.

Disclosure information verifier 137 verifies the validity of the disclosure information of the commitments of the other key exchange devices using partner identifier set 120 and the contributing data set of the other key exchange devices.

Auxiliary data verifier 138 verifies the validity of the auxiliary data of the other key exchange devices using partner identifier set 120 and the contributing data set and the auxiliary data set of the other key exchange devices.

If the validity is verified by all verifiers including signature verifier 136, disclosure information verifier 137, auxiliary data verifier 138, then shared key generator 139 generates and outputs shared key 135 using the contributing data sets, the disclosure information of the commitments, and the auxiliary data of the other key exchange devices, and the contributing random number saved in internal state saving section 126.

Contributing random number generator 102, selector 103, commitment generator 104, contributing data generator 110, internal state saving section 126, session number generator 130, signature section 133, auxiliary data generator 134, signature verifier 136, disclosure information verifier 137, auxiliary data verifier 138, and shared key generator 139 jointly make up calculating means for calculating two groups G, $G_T$ of the same order where there is a bilinear mapping from two elements belonging to group T onto group $G_T$. The contributing data and the auxiliary data serve as elements of group G.

Under the above premises, auxiliary data verifier 138 verifies the validity of the auxiliary data using a bilinear mapping between the contributing data and the auxiliary data.

Operation of key exchange device 100 thus constructed will be described below.

Each of key exchange devices $100(i)$ is supplied with partner identifier set 120 which is a set of identifiers U[j] of key exchange devices $100(j)$ where j={1, . . . , n}≠i, and partner public key set 121($pid$) which is a set of public keys pk[j] of key exchange device $100(j)$. Each key exchange device $200(i)$ is also supplied with identifier 122 and public key 123($pk$[i]) of its own key exchange device $100(i)$ and private key 124($sk$[i]) corresponding to public key 123($pk$[i]). Each key exchange device $100(i)$ is also supplied with random number 101.

In key exchange device $100(i)$, contributing random number generator 102 randomly generates a set of two contributing random numbers 105, 106 (i[i,0], r[i,1]∈Z/qZ) using random number 101.

Then, in key exchange device $100(i)$, contributing data generator 110 generates a set of two contributing data 111, 112($y[i,0]=g^{r[i,0]}$, $y[i,1]=g^{r[i]}$) using the set of two contributing random numbers 105, 106 (i[i,0], r[i,1]∈Z/qZ) generated by contributing random number generator 102.

Though two contributing random numbers and two contributing data are generated in the illustrated exemplary embodiment, they may be generated in any number provided that they are plural.

Then, in key exchange device $100(i)$, selector 103 randomly selects number 107 (b[i]∈{0,1}) designating one of the two contributing data generated by contributing data generator 110.

Then, in key exchange device $100(i)$, commitment generator 104 generates commitment 108 (com[i]) of number 107 (b[i]) selected by selector 103 and its disclosure information 109 (dec[i]).

Then, in key exchange device $100(i)$, communicating section 125 sends (U[i], pid, y[i,0], y[i,1]. com[i]) to other key exchange devices which are identified by identifiers that belong to partner identifier set 120.

In key exchange device $100(i)$, internal state saving section 126 saves pid, y[i,0], y[i,1], com[i], dec[i], b[i], r[i, b[i] as an internal state.

In key exchange device $100(i)$, communicating section 125 waits for pid, y[j,0], y[j,1]. com[j] to be sent via communication link 127 from key exchange devices $100(j)$ where j={1, n}≠i.

When all (pid, y[i,0], y[i,1], com[j]) are supplied, key exchange device $100(i)$ goes to the next process. Data (pid, (y[i,0], y[i,1].com[1], y[2,0], y[2,1]. com[2], y[n,0], y[n,1]. com[n])) made up of commitment data sets and commitments from key exchange devices $100(j)$ are referred to as consent data 119.

Then, in key exchange device $100(i)$, auxiliary data generator 134 takes out contributing data set of two key exchange devices $100(j)$ (referred to as adjacent devices 1, 2) from consent data 119, and generates auxiliary data set 128 (x[i,0,0]=$(y[i-1,0]/y[i+1,0])^{r[i,b[i]]}$, x[i,0,1]=$(y[i-1,0]/y[i+1,1])^{r[i,b[i]]}$, x[i,1,0]=$(y[i-1,1]/y[i+1,0])^{r[i,b[i]]}$, x[1,1]=$(y[i-1,1]/y[i+1,1])^{r[i,b[i]]}$, using the contributing data of adjacent devices 1, 2 and the contributing random number in internal state saving section 126.

Then, key exchange device $100(i)$ generates adjacent contributing random number data 129 (z[i,0]=$e(y[i+1,0],v)^{r[i,b[i]]}$, z[i,1]=$e(y[i+1,1],v)^{r[i,b[i]]}$, using the contributing data of adjacent device 2 and the contributing random number and the disclosure information in internal state saving section 126.

Then, in key exchange device $100(i)$, session number generator 130 generates hash value (sid=Hash(pid,y[1,0], y[1,1], com[1], y[2,0], y[2,1], com[2], . . . , y[n,0], y[n,1], com[n])) of consent data 119. The hash value is referred to as session number 131.

In key exchange device $100(i)$, signature section 133 generates consent confirmation signature 132 (sig[i]) which is a signature for session number 131, using public key 123 and private key 124.

Then, in key exchange device $100(i)$, communicating section 125 sends (U[i], sid, b[i], dec[i], x[i,0,0], x[i,0,1], x[i,1,0], x[i,1,1], sig[i]) to other key exchange devices which are identified by identifiers that belong to partner identifier set 120.

In key exchange device $100(i)$, internal state saving section 126 updates the internal state to (sid, pid, (y[1,0], y[1,1], com[1], y[2,0], y[2,1], com[2], y[n,0], y[n,1], com[n]), b[i], x[i,0,0], x[i,0,1], x[i,1,0], x[i,1,1], z[i,0], z[i,1].

In key exchange device $100(i)$, communicating section 125 waits for (U[j], sid, b[j], dec[j], x[j,0,0], x[j,0,1], x[j,1,0], x[j,1,1], sig[j]) to be sent via communication link 127 from key exchange devices $100(j)$ where j={1, ..., n}≠i.

When all (U[j], sid, b[j], dec[j], x[j,0,0], x[j,0,1], x[j,1,0], x[j,1,1], sig[j]) are supplied, key exchange device $100(i)$ goes to the next process.

Then, in key exchange device $100(i)$, signature verifier 136 confirms that sig[j] is a valid signature generated for sid by key exchange devices $100(j)$ with respect to all j except for i, using partner public key set 121.

Key exchange device $100(i)$ also confirms that (y[j,b[j,b[j]], x[j,b[j−1], b[j+1]]) is an element of G with respect to all j except for i.

In key exchange device $100(i)$, disclosure information verifier 137 confirms that com[j] is a commitment of b[j] with respect to all j except for i, using dec[j].

In key exchange device $100(i)$, auxiliary data verifier 138 confirms that e(x[j,b[j−1], b[j+1], g)=e(y[j−1, b[j−1]]/y[j+1, b[j+1]], y[j, b[j]] is satisfied with respect to all j except for i.

If all the above confirmations are made, then in key exchange device $100(i)$, shared key generator 139 generates shared key 135 (sk=z[i, b[i+1]]″e($\Pi_{j=1}$″x[i+j, b[i+j−1], b[i+j+1]]$^{n+1-j}$, v).

Thereafter, key exchange device $100(i)$ outputs (sid, pid, sk).

The present exemplary embodiment is characterized in that each key exchange device $100(i)$ generates two contributing data y[i,0], y[i,1]. In the present exemplary embodiment, joined data including two contributing data collected from all other key exchange devices $100(j)$ are referred to as session number sid.

According to the scheme of the background art, only one contributing data is generated, and joined contributing data cannot be regarded as a session number. Therefore, an additional data distribution phase is required. The reasons why joined contributing data cannot be regarded as a session number in the background art are as follows:

For a group key exchange to be safe, it is necessary to satisfy the condition that even when a key generated as a result of a key exchange leaks to an attacker, the internal state about the key exchange of all key exchange devices which take part in the key exchange has not leaked to the attacker.

To indicate that the key exchange is safe under the above condition, if there is an attacker who can estimate the key without the leakage of the internal state about the key exchange occurring, it is necessary to make clear to the attacker that some problems which are believed to be difficult to solve can be solved. Therefore, when a certain problem is given, data of the problem are given as contributing data of the key exchange to the attacker. At this time, since a contributing random number is not known, a person who has given the contributing data to the attacker does not know what is the key to be exchanged. When the attacker subsequently estimates the key, the given problem is solved based on the estimated result. A contributing random number corresponding to contributing data which do not include the data of the problem needs to be disclosed upon request from the attacker (because there is a condition in which data not related to the problem will not affect the security even when such data leak to the attacker).

Problems that are posed here are that it is not known which key will be attacked by the attacker and which set of contributing data makes up a key. The attacker activates each key exchange device a plurality of times to cause each key exchange device to output a plurality of contributing data, randomly combines some of the output contributing data to determine one session, and estimate a key corresponding to the session. For giving the data of the problem as contributing data, the set of contributing data selected by the attacked has to contain the exact data given. For example, if each of n key exchange devices generates t contributing data, then there are $t^n$ ways of selecting sets of the contributing data. The probability that a set of contributing data with the problem embedded therein will be selected is $1/t^n$. If n is greater, then the probability is smaller. Therefore, the probability that the attacker can solve the problem embedded in the contributing data is very small.

If two contributing data are generated according to the present exemplary embodiment, a problem can be embedded in one of the contributing data and the other contributing data can be used as contributing data capable of disclosing a contributing random number. When the attacker requests the contributing random number, the contributing random number that can be disclosed can be disclosed, asserting that it has been planned to use the contributing random number for generating a key. If attacked, it can be asserted that it has been planned to use the contributing data with the problem embedded therein for generating a key. According to the present exemplary embodiment, commitments are used, and only predetermined contributing data can be used to generate a key. For deceiving the attacker into solving the problem, a trapdoor is employed to use a convenient one of the contributing data.

According to the present exemplary embodiment, as described above, if a private key is shared by a plurality of key exchange devices, they may distribute data only twice. In addition, for generating a key, it is not necessary to input a unique session number to each of the key exchange devices. For generating the session number, it is necessary for each of the key exchange devices to distribute data to all the other key exchange devices. Such 1 to N communications are difficult to finish in a short period of time compared with simpler cryptographic calculations because it is time-consuming to achieve synchronization. According to the present exemplary embodiment, as the communication phase is dispensed with, it is possible to perform a more efficient key exchange. Actually, as a whole, only two data distribution phases are requested, one phase less than in the background art.

Although the present invention has been described above with respect to the exemplary embodiment, the present invention is not limited to the exemplary embodiment described above. Various changes that can be understood by those skilled in the art can be made in the configurations and details of the present invention within the scope of the invention.

The present application is the National Phase of PCT/JP2008/060556, filed Jun. 9, 2008, which claims priority based on Japanese patent application No. 2007-208197 filed on Aug. 9, 2007, and incorporates herein the entire disclosure thereof by reference.

INDUSTRIAL APPLICABILITY

A key exchange performed by a plurality of key exchange devices is effective as in applications wherein a conference is held by many users on a network. In order to prevent users other than the members from taking part in the conference and from eavesdropping on the contents of the conference, a private key shared by the conference members can be determined in advance using the key exchange device according to the present invention.

The invention claimed is:

1. A method comprising:

receiving, by a key exchange device, a partner identifier set identifying at least a first partner key exchange device and a second partner key exchange device and a partner public key set including at least a public key of the first partner key exchange device and a public key of the second partner key exchange device;

storing, by the key exchange device, an identifier of the key exchange device, a public key of the key exchange device, and a private key of the key exchange device;

receiving, by the key exchange device, a random number;

generating, by the key exchange device, a plurality of contributing random numbers using the random number;

generating, by the key exchange device, a plurality of contributing data using the contributing random numbers;

randomly selecting, by the key exchange device, a number identifying one contributing data of the plurality of contributing data;

generating, by the key exchange device, a commitment of the number and of disclosure information associated with the number;

sending, by the key exchange device to the first partner key exchange device, the identifier of the key exchange device, the public key of the first partner key exchange device, the plurality of contributing data, and the commitment of the number;

sending, by the key exchange device to the second partner key exchange device, the identifier of the key exchange device, the public key of the second partner key exchange device, the plurality of contributing data, and the commitment of the number;

receiving, by the key exchange device from the first partner key exchange device, the public key of the first key exchange device, a plurality of first partner contributing data generated by the first partner key exchange device, and a first partner commitment of a first partner number identifying one first partner contributing data of the of the plurality of first partner contributing data generated by the first partner key exchange device, as a first part of consent data;

receiving, by the key exchange device from the second partner key exchange device, the public key of the second key exchange device, a plurality of second partner contributing data generated by the second partner key exchange device, and a second partner commitment of a second partner number identifying one second partner contributing data of the of the plurality of second partner contributing data generated by the second partner key exchange device, as a second part of the consent data;

generating, by the key exchange device, auxiliary data based on the plurality of first partner contributing data, on the plurality of second partner contributing data, and on the number;

generating, by the key exchange device, adjacent contributing random number data, based on the plurality of second partner contributing data and on the number;

generating, by the key exchange device, a hash value, based on the consent data, the hash value referred to as a session number;

generating, by the key exchange device, a consent confirmation signature for the session number using the private key of the key exchange device;

sending, by the key exchange device to the first partner key exchange device and to the second partner key exchange device, the consent confirmation signature;

receiving, by the key exchange device from the first partner key exchange device, a first partner consent confirmation signature generated by the first partner key exchange device based on a first partner session number and on a private key of the first partner key exchange device;

receiving, by the key exchange device from the second partner key exchange device, a second partner consent confirmation signature generated by the second partner key exchange device based on a second partner session number and on a private key of the second partner key exchange device;

verify, by the key exchange device, the first partner consent information signature and the second partner consent information signature using the public key of the first partner key exchange and the public key of the second partner signature respectively;

first-confirming, by the key exchange device, that the first partner consent confirmation signature and the second partner consent confirmation signature are valid;

second-confirming, by the key exchange device, that the first partner commitment and the second partner commitment are valid;

upon at least the first-confirming and the second-confirming having been made, generating and outputting, by the key exchange device, a shared key for secure communication amongst the key exchange devices.

2. A non-transitory computer-readable data storage medium storing a computer program executable by a key exchange device to perform a method comprising:

receiving a partner identifier set identifying at least a first partner key exchange device and a second partner key exchange device and a partner public key set including at least a public key of the first partner key exchange device and a public key of the second partner key exchange device;

storing an identifier of the key exchange device, a public key of the key exchange device, and a private key of the key exchange device; receiving a random number; generating a plurality of contributing random numbers using the random number; generating a plurality of contributing data using the contributing random numbers;

randomly selecting a number identifying one contributing data of the plurality of contributing data;

generating a commitment of the number and of disclosure information associated with the number;

sending to the first partner key exchange device, the identifier of the key exchange device, the public key of the first partner key exchange device, the plurality of contributing data, and the commitment of the number;

sending to the second partner key exchange device, the identifier of the key exchange device, the public key of the second partner key exchange device, the plurality of contributing data, and the commitment of the number;

receiving from the first partner key exchange device, the public key of the first key exchange device, a plurality of first partner contributing data generated by the first partner key exchange device, and a first partner commitment of a first partner number identifying one first partner contributing data of the of the plurality of first partner contributing data generated by the first partner key exchange device, as a first part of consent data;

receiving from the second partner key exchange device, the public key of the second key exchange device, a plurality of second partner contributing data generated by the second partner key exchange device, and a second partner commitment of a second partner number identifying one second partner contributing data of the of the plurality of second partner contributing data generated by the second partner key exchange device, as a second part of the consent data;

generating auxiliary data based on the plurality of first partner contributing data, on the plurality of second partner contributing data, and on the number;

generating adjacent contributing random number data, based on the plurality of second partner contributing data and on the number;

generating a hash value, based on the consent data, the hash value referred to as a session number;

generating a consent confirmation signature for the session number using the private key of the key exchange device;

sending to the first partner key exchange device and to the second partner key exchange device, at least the consent confirmation signature;

receiving from the first partner key exchange device, a first partner consent confirmation signature generated by the first partner key exchange device based on a first partner session number and on a private key of the first partner key exchange device;

receiving from the second partner key exchange device, a second partner consent confirmation signature generated by the second partner key exchange device based on a second partner session number and on a private key of the second partner key exchange device;

verifying the first partner consent information signature and the second partner consent information signature using the public key of the first partner key exchange and the public key of the second partner signature respectively;

first-confirming that the first partner consent confirmation signature and the second partner consent confirmation signature are valid;

second-confirming that the first partner commitment and the second partner commitment are valid;

upon at least the first-confirming and the second-confirming having been made, generating and outputting a shared key for secure communication amongst the key exchange devices.

3. A system comprising:

a key exchange device;

a first partner key exchange device communicatively connected to the key exchange device; and a second partner key exchange device communicatively connected to the key exchange device, wherein the key exchange device receives a partner identifier set identifying at least a first partner key exchange device and a second partner key exchange device and a partner public key set including at least a public key of the first partner key exchange device and of the second partner key exchange device;

the key exchange device stores an identifier of the key exchange device, a public key of the key exchange device, and a private key of the key exchange device;

the key exchange device receives a random number;

the key exchange device generates a plurality of contributing random numbers using the random number;

the key exchange device generates a plurality of contributing data using the contributing random numbers;

the key exchange device randomly selects a number identifying one contributing data of the plurality of contributing data;

the key exchange device generates a commitment of the number and of disclosure information associated with the number;

the key exchange device sends to the first partner key exchange device, the identifier of the key exchange device, the public key of the first partner key exchange device, the plurality of contributing data, and the commitment of the number;

the key exchange device sends to the second partner key exchange device, the identifier of the key exchange device, the public key of the second partner key exchange device, the plurality of contributing data, and the commitment of the number;

the key exchange device receives from the first partner key exchange device, the public key of the first key exchange device, a plurality of first partner contributing data generated by the first partner key exchange device, and a first partner commitment of a first partner number identifying one first partner contributing data of the of the plurality of first partner contributing data generated by the first partner key exchange device, as a first part of consent data;

the key exchange device receives from the second partner key exchange device, the public key of the second key exchange device, a plurality of second partner contributing data generated by the second partner key exchange device, and a second partner commitment of a second partner number identifying one second partner contributing data of the of the plurality of second partner contributing data generated by the second partner key exchange device, as a second part of the consent data;

the key exchange device generates auxiliary data based on the plurality of first partner contributing data, on the plurality of second partner contributing data, and on the number;

the key exchange device generates adjacent contributing random number data, based on the plurality of second partner contributing data and on the number;

the key exchange device generates a hash value, based on the consent data, the hash value referred to as a session number;

the key exchange device generates a consent confirmation signature for the session number using the private key of the key exchange device;

the key exchange device sends to the first partner key exchange device and to the second partner key exchange device, the consent confirmation signature;

the key exchange device receives from the first partner key exchange device, a first partner consent confirmation signature generated by the first partner key exchange device based on a first partner session number and on a private key of the first partner key exchange device;

the key exchange device receives from the second partner key exchange device, a second partner consent confirmation signature generated by the second partner key exchange device based on a second partner session number and on a private key of the second partner key exchange device;

the key exchange device verifies the first partner consent information signature and the second partner consent information signature using the public key of the first partner key exchange and the public key of the second partner signature respectively;

the key exchange device first-confirms that the first partner consent confirmation signature and the second partner consent confirmation signature are valid;

the key exchange device second-confirms that the first partner commitment and the second partner commitment are valid;

upon at least the first-confirming and the second-confirming having been made, the key exchange device generates and outputs a shared key for secure communication amongst the key exchange devices.

\* \* \* \* \*